United States Patent [19]

Mueller

[11] Patent Number: 5,161,302
[45] Date of Patent: Nov. 10, 1992

[54] APPARATUS FOR FORMING SLEEVE AND PLUNGER ASSEMBLIES

[76] Inventor: Martin Mueller, 4929 E. Lake Shore Dr., Wonder Lake, Ill. 60097

[21] Appl. No.: 741,733

[22] Filed: Aug. 7, 1991

[51] Int. Cl.⁵ .................................................. B23P 21/00
[52] U.S. Cl. .......................................... 29/773; 29/771; 29/785; 29/790; 29/809; 198/418.4; 198/429; 493/108; 493/308; 493/156
[58] Field of Search ................. 29/771, 773, 785, 790, 29/809; 198/418.4, 429; 493/108, 308, 156

[56] References Cited

U.S. PATENT DOCUMENTS

| | | | |
|---|---|---|---|
| 3,807,022 | 4/1974 | Von Bredow | 29/785 |
| 4,209,899 | 7/1980 | Dragotta | 29/790 |
| 4,306,849 | 12/1981 | Cress et al. | 493/108 |
| 4,355,495 | 10/1982 | Lewis et al. | 29/773 |
| 4,441,955 | 4/1984 | Richardson et al. | 198/418.4 |
| 4,475,645 | 10/1984 | Young | 198/418.4 |
| 4,529,470 | 7/1985 | Weinstein | 29/773 |

Primary Examiner—P. W. Echols
Assistant Examiner—David P. Bryant

[57] ABSTRACT

An apparatus simultaneously forms a plurality of sleeve and plunger assemblies and creates dispensers of the pushup type. A platen inserts a plurality of plungers into a corresponding plurality of cardboard sleeves. The apparatus provides a plurality of sleeves at a particular location, aligns a corresponding plurality of plungers with an open end of each sleeve and sealingly engages each plunger in a displacable manner within the corresponding sleeve.

9 Claims, 4 Drawing Sheets

APPARATUS FOR FORMING SLEEVE AND PLUNGER ASSEMBLIES

The present invention relates to an apparatus for forming of a sleeve and plunger assembly, and more particularly to an apparatus for forming a plurality of sleeve and plunger assemblies simultaneously.

BACKGROUND OF THE INVENTION

A discharge device for a dispensing container is well-known. A sleeve and plunger assembly is a well known discharge device for a dispensing container. Such a device can be used for dispensing sherbert, ice cream or a similar food material. Basically the sleeve and plunger assembly includes a sleeve capable of containing the food material. The plunger forces the food out of the tube to a point where it may be consumed. As the food is consumed, the plunger forces more food out of the tube.

Such sleeve and plunger assemblies are well known in the art. However, it has been a major problem to form the sleeve and plunger assemblies in an efficient manner. The sleeve and plunger assembly must be formed efficiently and in quantity to be commercially effective.

It is known in the art to provide a method and apparatus for handling a packaging container of the sleeve and plunger type. In particular, a sleeve may have one open end, with a substantially closed end having an opening therein and being oppositely disposed from the open end. The sleeve sealingly engages a plunger along the axis thereof between the open and closed ends by insertion through the open end. One requirement of this particular structure is that each container is formed singly.

It is also known in the art to provide an apparatus for application of base cups to rounded bottle bottoms. This can be done in a continuous fashion by a continuous feed of bottles and base cups to an appropriate mechanism combined with a continuous removal of the resultant bottles. However, it is still only possible to assemble one such bottle at a time. With this apparatus, the base cup generally represents the plunger, and the bottle generally represents the sleeve in this particular case.

A similar assembly of forming an ice cream cone having a jacket wrapped therearound provides for only forming one at a time also. The cone itself provides the sleeve while the wrap provides the plunger or the insertion therein. In this case, such insertion procedures can only form one such assembly at a time.

It is clear that a machine accomplishing one assembly at a time must work a substantial period of time to provide a sufficient number of assemblies especially of the sleeve and plunger type. Such extra working time means a greater use and a correspondingly faster wear out time. Such a faster wear out time decreases production time and increases a downtime of the apparatus.

Accordingly, if a device or apparatus can be developed to efficiently assemble a plurality of sleeve and plunger assemblies at the same time while providing the apparatus with the insertion and takeoff mechanisms, a very desired result can be obtained.

SUMMARY OF THE INVENTION

Therefore, it is an objective of this invention to provide an apparatus to assemble more than one sleeve and plunger assembly at a time.

A further objective of this invention is to provide an apparatus for forming a sleeve and plunger assembly efficiently.

A still further objective of this invention is to provide an apparatus for forming a sleeve and plunger assembly in quantity.

Yet a further objective of the invention is to provide an apparatus for forming a sleeve and plunger assembly in quantity, which avoids a partially closed end sleeve.

Also an objective of this invention is to provide an apparatus for forming a sleeve and plunger assembly in quantity, which simplifies forming a two-piece assembly.

Another objective of this invention is to provide an apparatus for forming a sleeve and plunger assembly in quantity, which has a minimized downtime.

Yet another objective of this invention is to provide an apparatus for forming a sleeve and plunger assembly in quantity, which has a minimized repair requirement.

Still another objective of this invention is to provide a method for assembling more than one sleeve and plunger assembly at time.

A further objective of this invention is to provide a method for forming a sleeve and plunger assembly efficiently.

A still further objective of this invention is to provide a method for forming a sleeve and plunger assembly in quantity.

Yet a further objective of the invention is to provide a method for forming a sleeve and plunger assembly, which avoids using a partially closed end sleeve.

Also an objective of this invention is to provide a method for forming a sleeve and plunger assembly, which simplifies forming a two-piece assembly.

Another objective of this invention is to provide a method for forming a sleeve and plunger assembly in quantity, which has minimized downtime for the apparatus.

Yet another objective of this invention is to provide a method for forming a sleeve and plunger assembly in quantity, which has a minimized downtime.

These and other objectives of the invention (which other objectives become clear by consideration of the specification, claims and drawings as a whole) are met by providing an apparatus for simultaneously forming a plurality of sleeve and plunger assemblies to create dispensers of the pushup type. A novel platen inserts a plurality of plungers into a corresponding plurality of cardboard sleeves. The apparatus provides a plurality of sleeves at a particular location, aligns a corresponding plurality of plungers with an open end of each sleeve and sealingly engages each plunger in a displacable manner within the corresponding sleeve.

BRIEF DESCRIPTION OF THE DRAWINGS

Throughout the figures of the drawing where the same part appears in more than one figure, the same numeral is applied thereto.

DESCRIPTION OF THE PREFERRED EMBODIMENTS

Apparatus for simultaneously forming a plurality of sleeve and plunger assemblies creates dispensers of the pushup type for sherbert or similar foods. A novel platen inserts a plurality of plungers into a corresponding plurality of cardboard sleeves simultaneously thereby reducing production time and providing for more efficient use of the apparatus. This feature, in turn, reduces the down time and improves the functioning of the apparatus.

The apparatus provides a plurality sleeves at a particular location, aligns a corresponding plurality of plungers with an open end of each sleeve and sealingly engages each plunger in a displacable manner within the corresponding sleeve. A sleeve for use in this apparatus can be opened at both ends and purely tubular. The apparatus creates the plurality substantially simultaneously.

A key function of the apparatus to provide this plurality of dispensers is a novel platen which positions a plurality of plungers for engagement with an equal plurality of sleeves traveling within a carousel therefor. As the platen is engaged, the plungers are forced within the sleeves in a preferably upward fashion.

No modification of existing structures is required with the provision of the platen. Yet the provision of the platen reduces production time efficiently as well as reduces wear and tear on the parts of the mechanism producing engagement of the plungers within the sleeve. This factor also reduces downtime of the apparatus.

Figure 1:
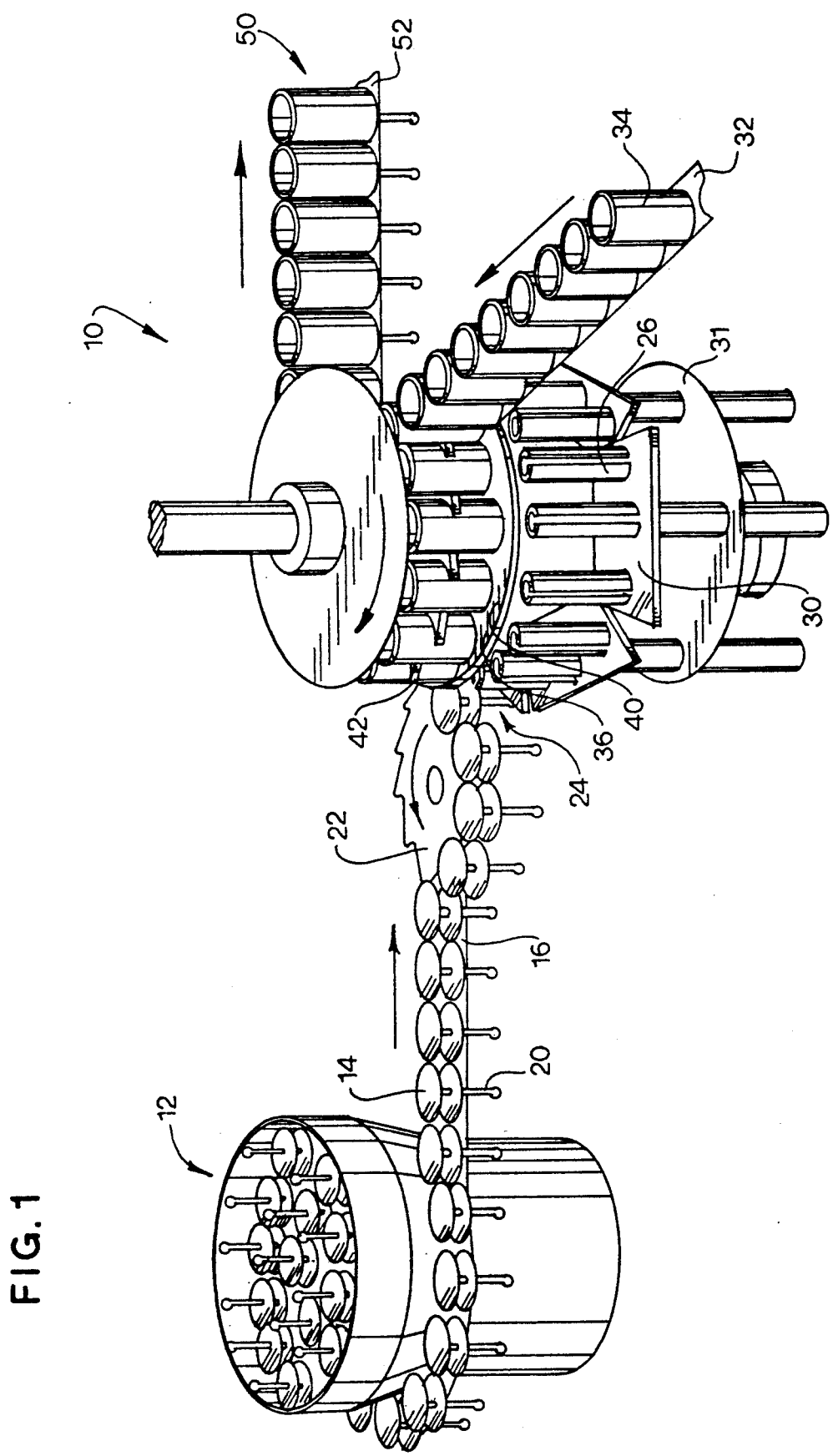
FIG. 1 is a perspective view of the sleeve and plunger engaging apparatus 10 incorporating the novel platen multiple plunger 14 engaging platen 30 of the invention.
Figure 2:
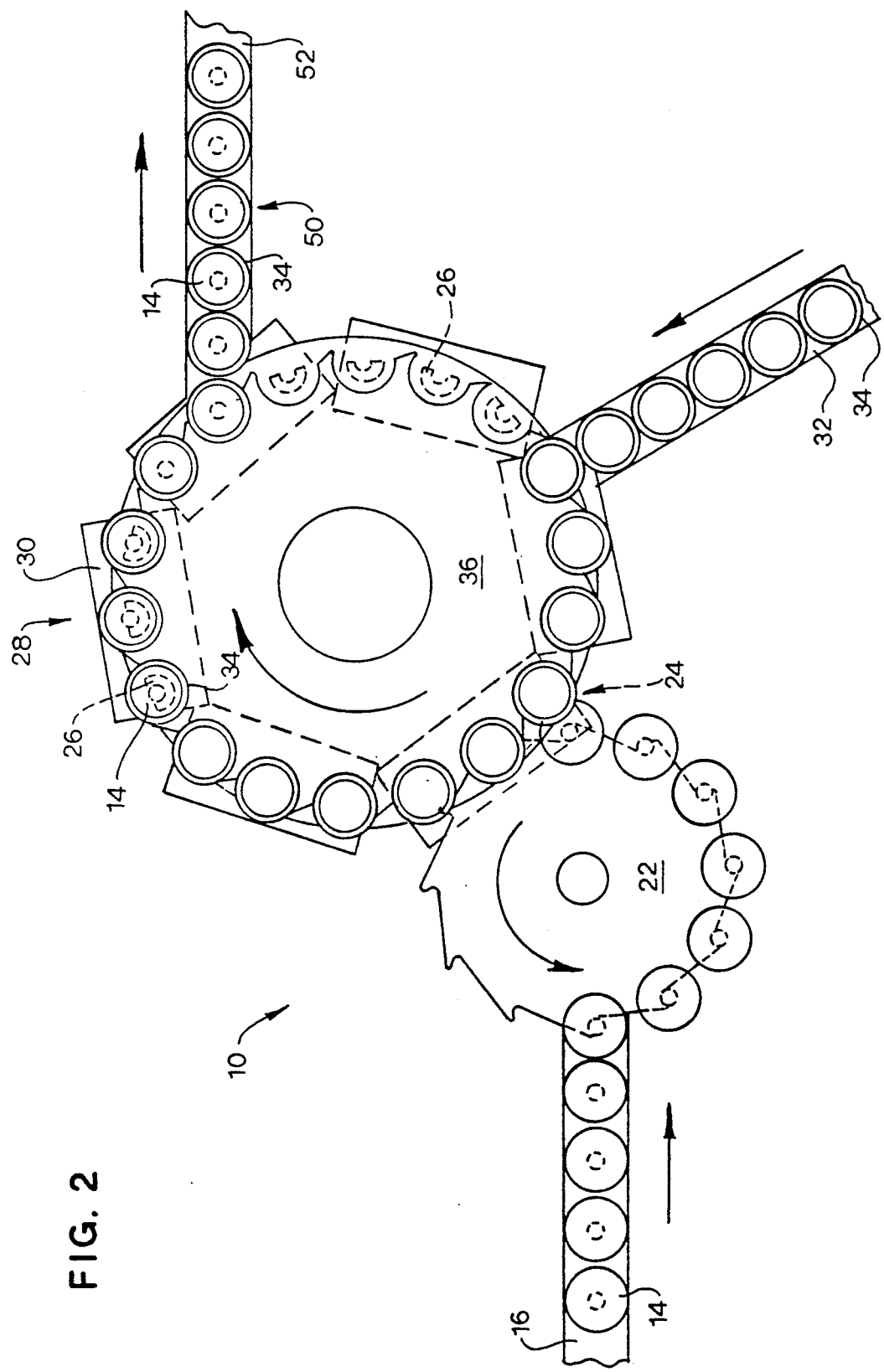
FIG. 2 is a top plan view of FIG. 1.

Referring now to FIG. 1 and FIG. 2, the apparatus 10 includes a hopper 12 to contain the plungers 14. The plungers 14 are transported and oriented for use by a first screw type conveyor which feeds the plungers 14 with a stem 20 thereof downwardly extending to a star wheel 22. The star wheel 22 carries the plungers 14 to a receiving station 24. At the receiving station 24, the star wheel 22 is engaged onto the towers 26. The towers 26 feed to engaging station 28.

The towers 26 are in the form of a cylinder 26 having an axial opening 29 in the wall thereof. The axial opening 29 of each cylinder 26 faces radially outwardly relative to the platform 31 and, when the star wheel 22 loads the plungers 14 thereon, the stem 20 of each plunger 14 fits through the opening 29 and is seated within the cylinder 26.

At the engaging station 28, the towers 26 are carried multiply upon platens 30. As shown in the drawings, it is preferable to have six platens 30 surrounding the circular feeding mechanism and three towers 26 on each platen 30. This provides for a simplified structure and efficient filling of the cardboard sleeves 34. The cardboard sleeves 34 can also be made of other suitable materials. The six platens 30 are provided and carried upon a rotatable platform 31. The rotatable platform 31 is eventually brought into engagement at the appropriate time within the engaging station 28.

The apparatus 10 also includes a second conveyor 32 which carries cardboard sleeves 34 from a source thereof (not shown) to a carousel 36 which supports the sleeves 34 thereon and is seated above the towers 26. By coordination of the carousel 36 and the rotatable platform 31, the cardboard sleeves 34 are positioned above the plungers 14.

The sleeves 34 are moved about upon an upper surface of the carousel 36 by a rotatable wheel 42 having slots on the periphery thereof which conform to the shape of the sleeves 34 and can engage and disengage the sleeves 34 as required. The structure of the rotatable wheel 42 serves to separate the sleeves 34 and align each sleeve 34 directly above a corresponding plunger 14 and tower 26.

Figure 3:
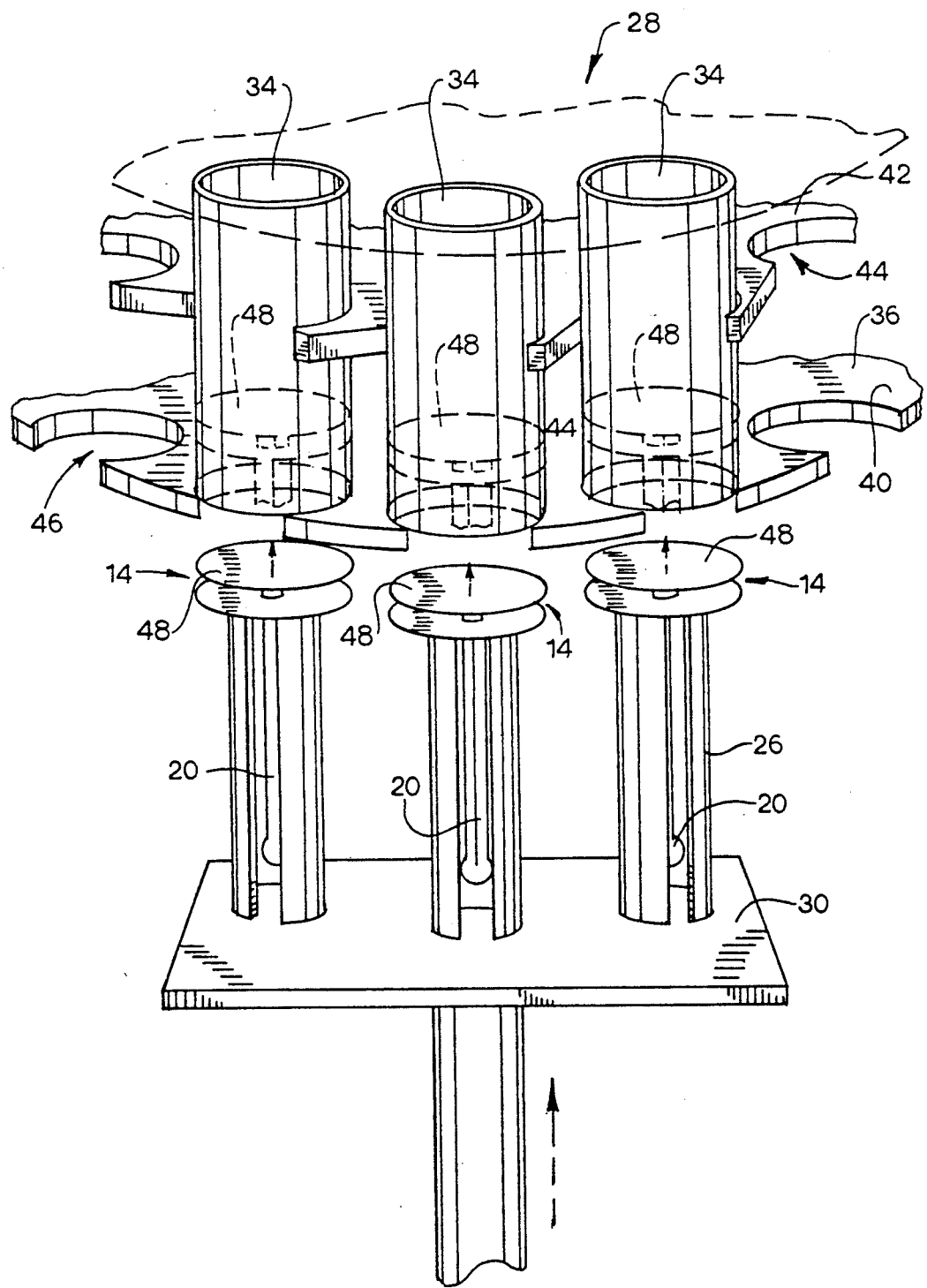
FIG. 3 is an enlarged perspective view of an engaging station of the apparatus wherein three plungers 14 are engaged to three corresponding sleeves 34 simultaneously by plungers 14—the plungers 14 and sleeves 34 being shown in phantom.

As more clearly shown in FIG. 3, the carousel 36 has a plurality of openings 46 therein defining the section thereof forming the portion of the engaging station 28. Openings 46 are provided to allow access to the interior of each sleeve 34 for engagement of the plunger 14 therein. Engagement takes place at the engaging station 28 wherein the platen 30 seats directly beneath the openings 46 and the carousel 36. As the platen 30 rises, the towers 26 having the plunger 14 inserted therein force the plungers 14 into the cardboard sleeve 34. As the parallel flats 48 carrying the plungers 14 and towers 26 rise on the platen 30, the plungers 14 are inserted into the interior of three corresponding sleeves 34 as shown in phantom in FIG. 3.

After engagement of the three plungers 14 upon one platen 30 within the three corresponding sleeves 34, the sleeve and plunger assemblies 50 are thus formed and fed to a third conveyor 52 and carried away from the apparatus 10. It is possible to either store the assembled sleeve and plunger assemblies 50 and ship them to another source or immediately convey the assembled sleeve and plunger assemblies 50 to another area of the same plant for immediately filling with the appropriate food.

Figure 4:
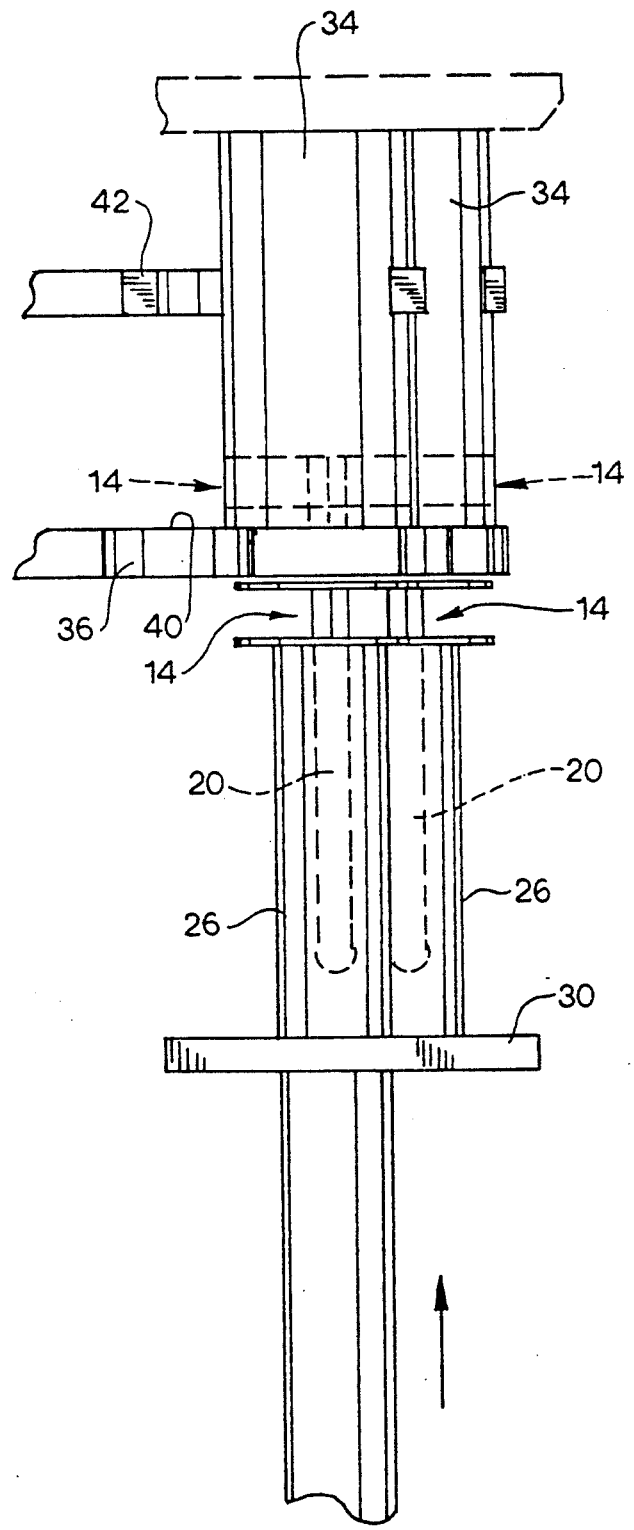
FIG. 4 is a side view of FIG. 3.

Inasmuch as the peripheral engagement of the sleeves 34 by the wheel 42 seats them in a arcuate pattern within the engaging station 28, the towers 26 on each platen 30 must also be arcuately disposed for correspondence with the sleeves 34 thereabove, as best illustrated in FIG. 4.

A modification of the carousel 36 upon which the sleeves 34 ride is shown to have a possible five (5) openings 46 rather than the required three for use with the particular platen 30 disclosed herein. This provides for the possible expansion to five tower platen creating five or more sleeve and plunger assemblies 50 at a time. It is understood that as much as six platens 30 are provided. The rotatable platform 31 upon which the platens 30 are mounted must necessarily turn sixty (60°) degrees upon each rotation thereof to place the next platen 30 within the engaging station 28. Consequently the rotatable wheel 42 which moves the sleeves 34 around the carousel 36 also rotates the sixty (60°) degrees every time it is actuated. Actuation of the wheel 42 and the platform 31 are provided in any known manner suitable for controlled rotation. Likewise the platen 30 seated when within the engaging station 28 are actuated to move upwardly in a known manner suitable for controlling vertical lift and release. A typical application thereof is to provide a cam action to achieve this structure.

This apparatus 10 is especially suitable for inserting a special type plungers 14 in sleeves 34. The plunger 14 is highly preferred to be of the type set forth in U.S. patent application Ser. No. 07/626,561 filed Dec. 12, 1990, by the same inventor herein, and incorporated herein by reference.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by Letters Patent of the United States is:

1. An apparatus for forming a plurality of sleeve and plunger assemblies simultaneously with each plunger being displaceably and sealingly engaged within a sleeve, the apparatus comprising:

a hopper for holding a supply of plungers;
   first conveyor means for transporting a plurality of plungers to an engaging station of the apparatus in a predetermined position;
   said first conveyor feeding said plungers singularly to a star wheel;
   said star wheel, in turn, feeding said plungers singularly to plunger engaging towers multiply mounted on a plurality of platens;
   said platens being, in turn, movable to align within said engaging station under a corresponding plurality of sleeves;
   said platens each carrying three plunger engaging towers;
   second conveyor means for transporting a plurality of sleeves to the engaging station of the apparatus in a manner in which the sleeves are aligned with the plungers;
   said second conveyor feeding the sleeves from an external source of a carousel upon and about which the sleeves circulate;
   said sleeves being circulated along said carousel by a rotatable wheel having openings in the circumference thereof sized and configured to releasably engage said sleeves, the openings in the circumference of the wheel being spaced from one another a distance equal to the spacing between adjacent plunger engaging towers on a platen;
   said carousel having a plurality of circumferential openings therein which align directly above the plunger engage towers and directly beneath the openings in the rotatable wheel when aligned thereabove in the engaging station;
   means for causing a plurality of said plungers to be simultaneously engaged to a corresponding plurality of aligned sleeves at said engaging station of the apparatus; and
   means for carrying away the sleeve and plunger assemblies from said engaging station.

2. The apparatus of claim 1 wherein said platens are upwardly displaced within said engaging station to seat flats of the plungers carried by the towers within corresponding sleeves thereabove.

3. The apparatus of claim 2 wherein said means for carrying away the assemblies comprises a conveyor.

4. The apparatus of claim 3 wherein said plurality of platens equals six.

5. The apparatus of claim 4 wherein said plurality of platens are carried on a rotatable platform.

6. The apparatus of claim 5 wherein each rotation of the platform covers sixty degrees.

7. The apparatus of claim 6 wherein said rotatable wheel rotates upon each motion of said platform.

8. The apparatus of claim 7 wherein said towers are positioned upon each platen along an arc in a manner to correspondingly seat below the circumferential openings of said carousel.

9. An apparatus for forming a plurality of sleeve and plunger assemblies simultaneously with each plunger being displaceably and sealingly engaged within a sleeve, the apparatus comprising;

a hopper for holding a supply of plungers;
   means for transporting a plurality of plungers to an engaging station of the apparatus in a predetermined position;
   a hopper for holding a supply of sleeves;
   means for transporting a corresponding plurality of sleeves to the engaging station of the apparatus in a manner where the sleeves are aligned with the plungers;
   means for causing the plurality of said plungers to be simultaneously engaged to the corresponding plurality of aligned sleeves at said engaging station of the apparatus;
   means for carrying away the sleeve and plunger assemblies from said engaging station;
   said means for transporting said plungers to said engaging station including a first conveyor which transports and feeds said plungers singularly to a star wheel, said star wheel, in turn, feeding said plungers singularly to plunger engaging towers multiply mounted on a plurality of platens, said platens being movable to align said plungers with said sleeves within said engaging station;
   said engaging station further including a second conveyor which feeds sleeves from said hopper to a carousel upon and about which the sleeves are circulated by a rotatable wheel having openings in the circumference thereof sized and configured to releasably engage said sleeves, the openings in the circumference of the wheel being spaced from one another a distance equal to the spacing between adjacent plunger engaging towers on each platen;
   said carousel having a plurality of circumferential openings therein which align directly above the plunger engaging towers;
   said platens being upwardly displaceable within said engaging station to seat flats of the plungers carried by the towers within corresponding sleeves thereabove;
   said plurality of platens being carried on a rotatable platform;
   each rotation of the platform covering sixty degrees;
   said rotatable wheel rotating upon each motion of said platform;
   said towers being positioned upon each platen along an arc in a manner to correspondingly seat below the circumferential openings of said carousel; and
   said means for carrying away the assemblies comprising a third conveyor.

* * * * *